United States Patent
Liu et al.

(10) Patent No.: US 12,430,034 B2
(45) Date of Patent: Sep. 30, 2025

(54) MEMORY CONTROLLER AND MEMORY SYSTEM PERFORMING DATA SEARCH BASED ON LOGICAL-TO-PHYSICAL MAPPING TABLE

(71) Applicant: YANGTZE MEMORY TECHNOLOGIES CO., LTD., Wuhan (CN)

(72) Inventors: Weilin Liu, Wuhan (CN); Kai Liu, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 18/226,720

(22) Filed: Jul. 26, 2023

(65) Prior Publication Data
US 2024/0411456 A1    Dec. 12, 2024

Related U.S. Application Data

(63) Continuation of application No. PCT/CN2023/099301, filed on Jun. 9, 2023.

(51) Int. Cl.
*G06F 3/06* (2006.01)
*G06F 12/1009* (2016.01)

(52) U.S. Cl.
CPC .......... *G06F 3/0613* (2013.01); *G06F 3/0646* (2013.01); *G06F 3/068* (2013.01); *G06F 12/1009* (2013.01)

(58) Field of Classification Search
CPC ...... G06F 3/0613; G06F 3/0646; G06F 3/068; G06F 12/1009
See application file for complete search history.

(56) References Cited

U.S. PATENT DOCUMENTS

| | | | |
|---|---|---|---|
| 6,810,037 B1 * | 10/2004 | Kalapathy | H04L 45/54 709/215 |
| 2005/0047411 A1 * | 3/2005 | Kadambi | H04L 47/2408 370/395.32 |
| 2008/0195802 A1 | 8/2008 | Lee et al. | |
| 2012/0239853 A1 * | 9/2012 | Moshayedi | G06F 3/0613 711/E12.001 |
| 2013/0111116 A1 * | 5/2013 | Inada | G06F 12/0246 711/E12.008 |

(Continued)

FOREIGN PATENT DOCUMENTS

KR    20080075618 A    8/2008

OTHER PUBLICATIONS

International Search Report International Search Report issued in corresponding International Application No. PCT/CN2023/099301, mailed on Dec. 11, 2023, 4 pages.

*Primary Examiner* — Ryan Bertram
(74) *Attorney, Agent, or Firm* — BAYES PLLC

(57) ABSTRACT

In certain aspects, a memory system includes a volatile memory device and a memory controller operatively coupled to the volatile memory device. The volatile memory device is configured to store a logical-to-physical (L2P) mapping table. The memory controller is configured to maintain the L2P mapping table stored in the volatile memory device, such that the L2P mapping table maps a first set of logical addresses to identifiers (IDs) of memory blocks of a cache, respectively.

20 Claims, 10 Drawing Sheets

(56) References Cited

U.S. PATENT DOCUMENTS

| | | | |
|---|---|---|---|
| 2013/0124794 A1* | 5/2013 | Bux | G06F 12/0246 |
| | | | 711/103 |
| 2014/0281161 A1 | 9/2014 | Chen et al. | |
| 2014/0304453 A1* | 10/2014 | Shao | G06F 12/0246 |
| | | | 711/103 |
| 2018/0150390 A1 | 5/2018 | Chien et al. | |
| 2019/0286570 A1* | 9/2019 | Miura | G06F 12/0246 |
| 2019/0286571 A1* | 9/2019 | Mori | G06F 12/0246 |
| 2020/0250090 A1 | 8/2020 | Ware et al. | |
| 2020/0341909 A1* | 10/2020 | Vanninen | G06F 12/1018 |
| 2022/0027265 A1* | 1/2022 | Li | G06F 12/0246 |
| 2023/0289091 A1* | 9/2023 | Pai | G06F 12/0238 |
| 2023/0409470 A1* | 12/2023 | Muthiah | G06F 13/1668 |
| 2024/0143531 A1* | 5/2024 | Inoue | G06F 13/28 |

* cited by examiner

MEMORY CONTROLLER AND MEMORY SYSTEM PERFORMING DATA SEARCH BASED ON LOGICAL-TO-PHYSICAL MAPPING TABLE

CROSS-REFERENCE TO RELATED APPLICATIONS

This application is a continuation of International Application No. PCT/CN2023/099301, filed on Jun. 9, 2023, and entitled "MEMORY CONTROLLER AND MEMORY SYSTEM PERFORMING DATA SEARCH," which is incorporated by reference herein in its entirety.

BACKGROUND

The present disclosure relates to memory devices and operation methods thereof.

Solid-state drives (SSDs) are a type of non-volatile data storage devices that have gained significant popularity in recent years due to their numerous advantages over traditional hard disk drives (HDDs), such as faster read and write speed, durability and reliability, reduced power consumption, silent operation, and smaller form factors. SSDs typically use NAND Flash memory for non-volatile storage. Some SSDs, in particular enterprise SSDs, also use volatile memory (e.g., dynamic random-access memory (DRAM)) to enhance their performance, allowing faster access to data and more efficient handling of read and write operations.

SUMMARY

In one aspect, a memory system includes a volatile memory device and a memory controller operatively coupled to the volatile memory device. The volatile memory device is configured to store a logical-to-physical (L2P) mapping table. The memory controller is configured to maintain the L2P mapping table stored in the volatile memory device, such that the L2P mapping table maps a first set of logical addresses to identifiers (IDs) of memory blocks of a cache, respectively.

In some implementations, the memory controller is further configured to cache a first set of data in the memory blocks. In some implementations, the first set of data is associated with the first set of logical addresses, respectively.

In some implementations, the memory controller is further configured to search the first set of data cached in the memory blocks based on the L2P mapping table.

In some implementations, the volatile memory device includes the cache.

In some implementations, the memory system further includes a non-volatile memory device operatively coupled to the memory controller. In some implementations, the memory controller is further configured to store a second set of data in memory regions of the non-volatile memory device. In some implementations, the second set of data is associated with a second set of logical addresses, respectively. In some implementations, the memory controller is further configured to maintain the L2P mapping table stored in the volatile memory device, such that the L2P mapping table also maps the second set of logical addresses to physical addresses of the memory regions of the non-volatile memory device, respectively.

In some implementations, the volatile memory device includes DRAM, and the non-volatile memory device includes NAND Flash memory.

In some implementations, the memory controller is further configured to, in response to receiving a write request indicative of a piece of the first set of data associated with a first logical address of the first set of logical addresses, assign the piece of the first set of data to a first memory block of the memory blocks. In some implementations, the first memory block has a first ID of the IDs. The memory controller is further configured to fetch the piece of the first set of data to cache the piece of the first set of data into the first memory block.

In some implementations, to maintain the L2P mapping table, the memory controller includes an L2P search engine configured to, in response to fetching the piece of the first set of data to the first memory block, update the L2P mapping table to map the first logical address to the first ID.

In some implementations, the memory controller is further configured to, in response to receiving a read request indicative of a piece of the first set of data associated with a second logical address of the first set of logical addresses, fetch the piece of the first set of data from a second memory block of the memory blocks in the cache based on the L2P mapping table.

In some implementations, the memory controller includes an L2P search engine configured to determine an address of the L2P mapping table in the volatile memory device based on the second logical address, and identify a second ID of the IDs at the address of the L2P mapping table in the volatile memory device. In some implementations, the second memory block has the second ID.

In another aspect, a memory system includes a non-volatile memory device including memory regions each associated with a physical address, a volatile memory device including memory blocks each associated with an ID, and a memory controller operatively coupled to the volatile memory device and the non-volatile memory device. The volatile memory device is configured to store an L2P mapping table. The L2P mapping table maps logical addresses of data to the IDs of the memory blocks in the volatile memory device and the physical addresses of the memory regions in the non-volatile memory device, respectively. The memory controller is configured to search a piece of the data based on the L2P mapping table.

In some implementations, to search the piece of the data, the memory controller is configured to determine an address of the L2P mapping table in the volatile memory device based on a logical address associated with the piece of the data, and determine a value at the address of the L2P mapping table.

In some implementations, to search the piece of the data, the memory controller is further configured to, in response to the value being one of the IDs of the memory blocks in the volatile memory device, fetch the piece of the data from the memory block in the volatile memory device having the ID, and in response to the value being one of the addresses of the memory regions in the non-volatile memory device, fetch the piece of the data from the memory region in the non-volatile memory device having the physical address.

In some implementations, to search the piece of data, the memory controller comprises a plurality of L2P search engines configured to search a plurality of pieces of the data, respectively, in parallel based on the L2P mapping table.

In some implementations, the memory controller is further configured to cache the piece of the data in the volatile memory device or flush the piece of the data from the volatile memory device to the non-volatile memory device.

In still another aspect, a memory controller includes a volatile memory device interface operatively coupled to a volatile memory device, and an L2P search engine configured to maintain an L2P mapping table stored in the volatile memory device through the volatile memory device interface, such that the L2P mapping table maps a first set of logical addresses to IDs of memory blocks of a cache, respectively.

In some implementations, the L2P search engine is further configured to search a first set of data associated with the first set of logical addresses and cached in the memory blocks based on the L2P mapping table.

In some implementations, the memory controller further includes a non-volatile memory device interface operatively coupled to a non-volatile memory device. In some implementations, the L2P search engine is further configured to maintain the L2P mapping table stored in the volatile memory device, such that the L2P mapping table also maps a second set of logical addresses to physical addresses of memory regions of the non-volatile memory device, respectively.

In some implementations, the L2P search engine is further configured to search a second set of data associated with the second set of logical addresses and stored in the memory regions based on the L2P mapping table.

In some implementations, the volatile memory device includes DRAM, and the non-volatile memory device includes NAND Flash memory.

In some implementations, the memory controller further includes a range division accelerator configured to, in response to receiving a write request indicative of a piece of the first set of data associated with a first logical address of the first set of logical addresses, assign the piece of the first set of data to a first memory block of the memory blocks. In some implementations, the first memory block has a first ID of the IDs. In some implementations, the memory controller further includes a host interface configured to fetch the piece of the first set of data to cache the piece of the first set of data into the first memory block.

In some implementations, to maintain the L2P mapping table, the L2P search engine is further configured to, in response to the host interface fetching the piece of the first set of data to the first memory block, update the L2P mapping table to map the first logical address to the first ID.

In some implementations, the memory controller further includes a host interface configured to, in response to receiving a read request indicative of a piece of the first set of data associated with a second logical address of the first set of logical addresses, fetch the piece of the first set of data from a second memory block of the memory blocks in the cache based on the L2P mapping table.

In some implementations, the L2P search engine is further configured to determine an address of the L2P mapping table in the volatile memory device based on the second logical address, and identify a second ID of the IDs at the address of the L2P mapping table in the volatile memory device, the second memory block having the second ID.

In yet another aspect, a method for operating a memory controller is provided. An L2P mapping table stored in a volatile memory device is generated. The L2P mapping table is maintained, such that the L2P mapping table maps a first set of logical addresses to IDs of memory blocks of a cache, respectively.

In some implementations, a first set of data in the memory blocks is cached. In some implementations, the first set of data is associated with the first set of logical addresses, respectively.

In some implementations, the first set of data in the memory blocks is searched based on the L2P mapping table.

In some implementations, the volatile memory device includes the cache.

In some implementations, a second set of data is stored in memory regions of a non-volatile memory device. In some implementations, the second set of data is associated with a second set of logical addresses, respectively. In some implementations, the L2P mapping table stored in the volatile memory device is maintained, such that the L2P mapping table also maps the second set of logical addresses to physical addresses of the memory regions of the non-volatile memory device, respectively.

In some implementations, the volatile memory device includes DRAM, and the non-volatile memory device includes NAND Flash memory.

In some implementations, in response to receiving a write request indicative of a piece of the first set of data associated with a first logical address of the first set of logical addresses, the piece of the first set of data is assigned to a first memory block of the memory blocks. In some implementations, the first memory block has a first ID of the IDs. In some implementations, the piece of the first set of data is fetched to cache the piece of the first set of data into the first memory block.

In some implementations, to maintain the L2P mapping table, in response to fetching the piece of the first set of data to the first memory block, the L2P mapping table is updated to map the first logical address to the first ID.

In some implementations, in response to receiving a read request indicative of a piece of the first set of data associated with a second logical address of the first set of logical addresses, the piece of the first set of data is fetched from a second memory block of the memory blocks in the cache based on the L2P mapping table.

In some implementations, an address of the L2P mapping table in the volatile memory device is determined based on the second logical address, and a second ID of the IDs is identified at the address of the L2P mapping table in the volatile memory device. In some implementations, the second memory block has the second ID.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

Figure 1:
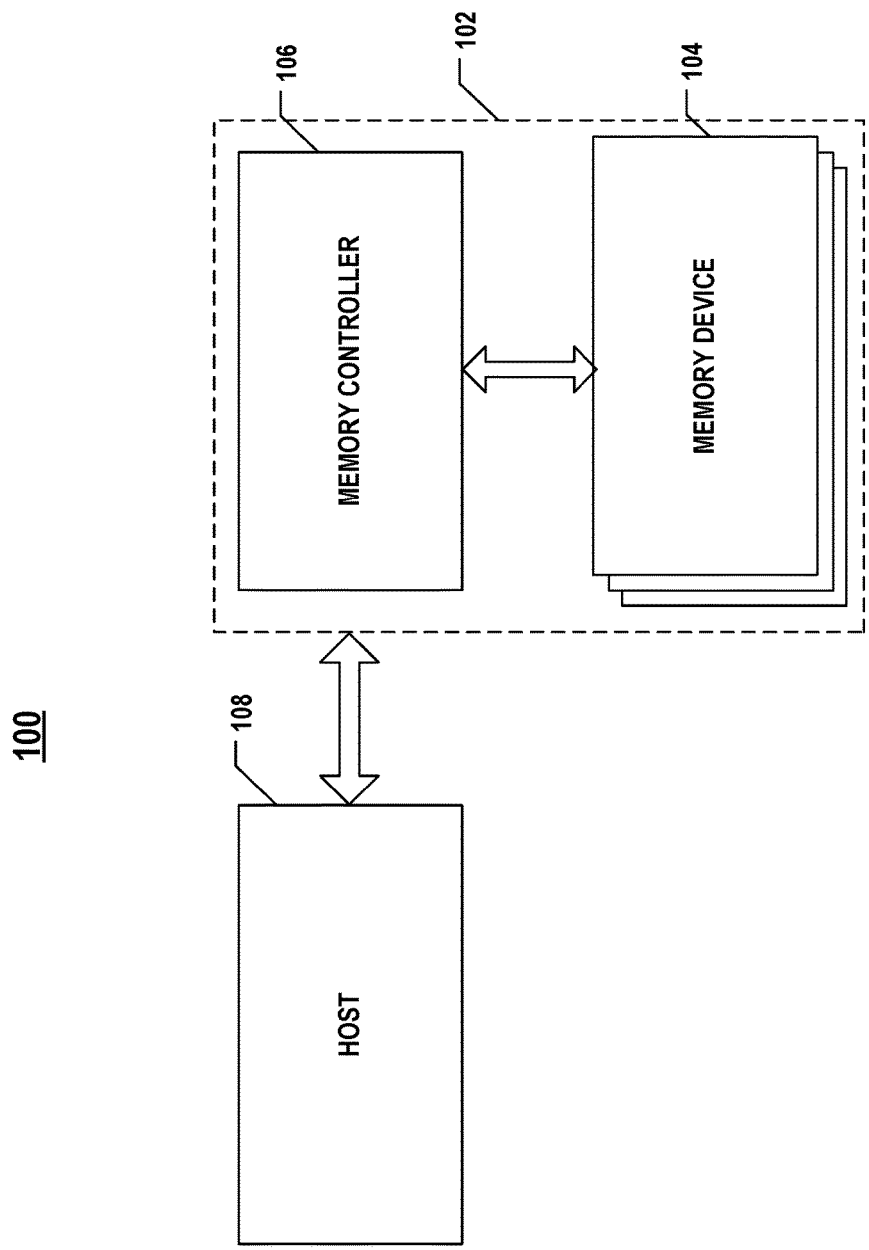
FIG. 1 illustrates a block diagram of a system including a memory system, according to some aspects of the present disclosure.

The present disclosure will be described with reference to the accompanying drawings.

DETAILED DESCRIPTION

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Data search in an SSD involves locating and accessing the requested data stored in non-volatile storage, such as the NAND Flash memory. The purpose of data search is to efficiently retrieve or modify the data as needed by the system. This can be achieved through a translation layer of the memory controller that maps logical addresses used by the operating system to physical addresses within the SSD. The memory controller thus plays a crucial role in managing data search and ensuring optimal performance.

For enterprise SSDs, or any SSDs with volatile memory, such as DRAM, "hot data" refers to frequently used and/or recently accessed data that is stored in the cache. The hot data is often cached in DRAM to speed up future access requests. The efficiency of known search algorithms for hot data in enterprise SSDs, however, is limited by its time complexity of O(n) or O(log n) and can become a bottleneck of performance, especially when the data quantity is huge.

To address one or more of the aforementioned issues, the present disclosure introduces data search schemes in memory systems that expand the usage of the L2P mapping table to both non-volatile memory and volatile memory to reduce the complexity of cache data search in volatile memory and improve search efficiency. In some implementations, similar to the physical addresses of memory regions in non-volatile memory (e.g., the physical page address (PPA) in NAND Flash memory), the physical addresses of memory blocks in volatile memory (e.g., block identifiers (IDs)) are mapped to logical addresses of host/user data (e.g., the logical block address (LBA)) in a uniform, expanded L2P mapping table for data search across the non-volatile memory and volatile memory. The time complexity for hot data search thus can be reduced to O(1). In some implementations, the memory controller maintains the uniform, expanded L2P mapping table and updates it in response to handling the write and read requests from the host. In some implementations, multiple dedicated circuits, as opposed to firmware, are used to handle data search requests in parallel to further improve search efficiency and reduce firmware overhead.

FIG. 1 illustrates a block diagram of a system 100 including a memory system 102, according to some aspects of the present disclosure. System 100 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 1, system 100 can include a host 108 and memory system 102 having one or more memory devices 104 and a memory controller 106. Host 108 can be a processor of an electronic device, such as a central processing unit (CPU), or a system-on-chip (SoC), such as an application processor (AP). Host 108 can be configured to send or receive data (a.k.a. user data or host data) to or from memory system 102. Memory system 102 can be a storage product integrating memory controller 106 and one or more memory devices 104, such as an SSD.

Memory devices 104 can be any memory devices disclosed in the present disclosure, including non-volatile memory devices, such as NAND Flash memory devices. In some implementations, memory device 104 also includes one or more volatile memory devices, such as DRAM devices or static random-access memory (SRAM) devices.

Memory controller 106 is operatively coupled to memory devices 104 and host 108 and is configured to control memory devices 104, according to some implementations. Memory controller 106 can manage the data stored in memory devices 104 and communicate with host 108. In some implementations, memory controller 106 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 106 is designed for operating in a high duty-cycle environment with SSDs or embedded multimedia card (eMMCs) used as data storage for mobile devices, such as smartphones, tablets, laptop computers, etc., and enterprise storage arrays. Memory controller 106 can be configured to control operations of memory devices 104, such as read, program/write, and/or erase operations. Memory controller 106 can also be configured to manage various functions with respect to the data stored or to be stored in memory devices 104 including, but not limited to bad-block management, garbage collection, L2P address conversion, wear-leveling, etc. In some implementations, memory controller 106 is further configured to process error correction codes (ECCs) with respect to the data read from or written to memory devices 104. Any other suitable functions may be performed by memory controller 106 as well, for example, formatting memory devices 104. Memory controller 106 can communicate with an external device (e.g., host 108) according to a particular communication protocol. For example, memory controller 106 may communicate with the external device through at least one of various interface protocols, such as a non-volatile memory express (NVMe) protocol, an NVMe-over-fabrics (NVMe-oF) protocol, a PCI-express (PCI-E) protocol, a universal serial bus (USB) protocol, a multimedia card (MMC) protocol, a peripheral component interconnection (PCI) protocol, an advanced technology attachment (ATA) protocol, a serial-ATA protocol, a parallel-ATA protocol, a small computer small interface (SCSI)

protocol, an enhanced small disk interface (ESDI) protocol, an integrated drive electronics (IDE) protocol, a Firewire protocol, etc.

Consistent with the scope of the present disclosure and disclosed below in detail, memory controller 106 can be configured to maintain an L2P mapping table that maps logical addresses of host/user data to the IDs of memory blocks in the volatile memory device of memory devices 104 and the addresses of memory regions in the non-volatile memory device of memory devices 104, respectively. Memory controller 106 can also be configured to search a piece of the data based on the L2P mapping table.

Figure 2A:
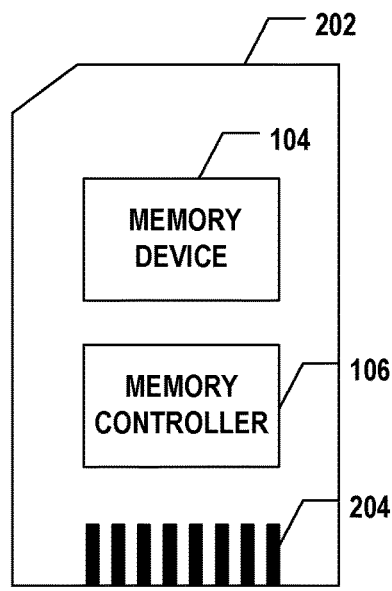
FIG. 2A illustrates a diagram of a memory card having a memory device, according to some aspects of the present disclosure.
Figure 2B:
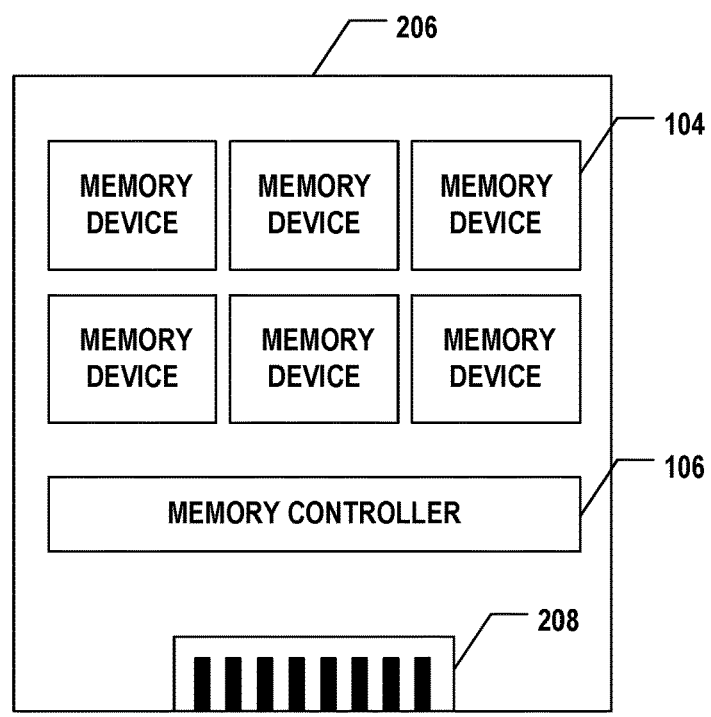
FIG. 2B illustrates a diagram of an SSD having memory devices, according to some aspects of the present disclosure.

Memory controller 106 and one or more memory devices 104 can be integrated into various types of storage devices, for example, being included in the same package, such as a universal Flash storage (UFS) package or an eMMC package. That is, memory system 102 can be implemented and packaged into different types of end electronic products. In one example as shown in FIG. 2A, memory controller 106 and a single memory device 104 may be integrated into a memory card 202. Memory card 202 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 202 can further include a memory card connector 204 coupling memory card 202 with a host (e.g., host 108 in FIG. 1). In another example as shown in FIG. 2B, memory controller 106 and multiple memory devices 104 may be integrated into an SSD 206. SSD 206 can further include an SSD connector 208 coupling SSD 206 with a host (e.g., host 108 in FIG. 1). In some implementations, the storage capacity and/or the operation speed of SSD 206 is greater than those of memory card 202. In some implementations, memory system 102 is implemented as an SSD 206 that includes both non-volatile memory devices and volatile memory devices as memory devices 104, such as an enterprise SSD.

Figure 3:
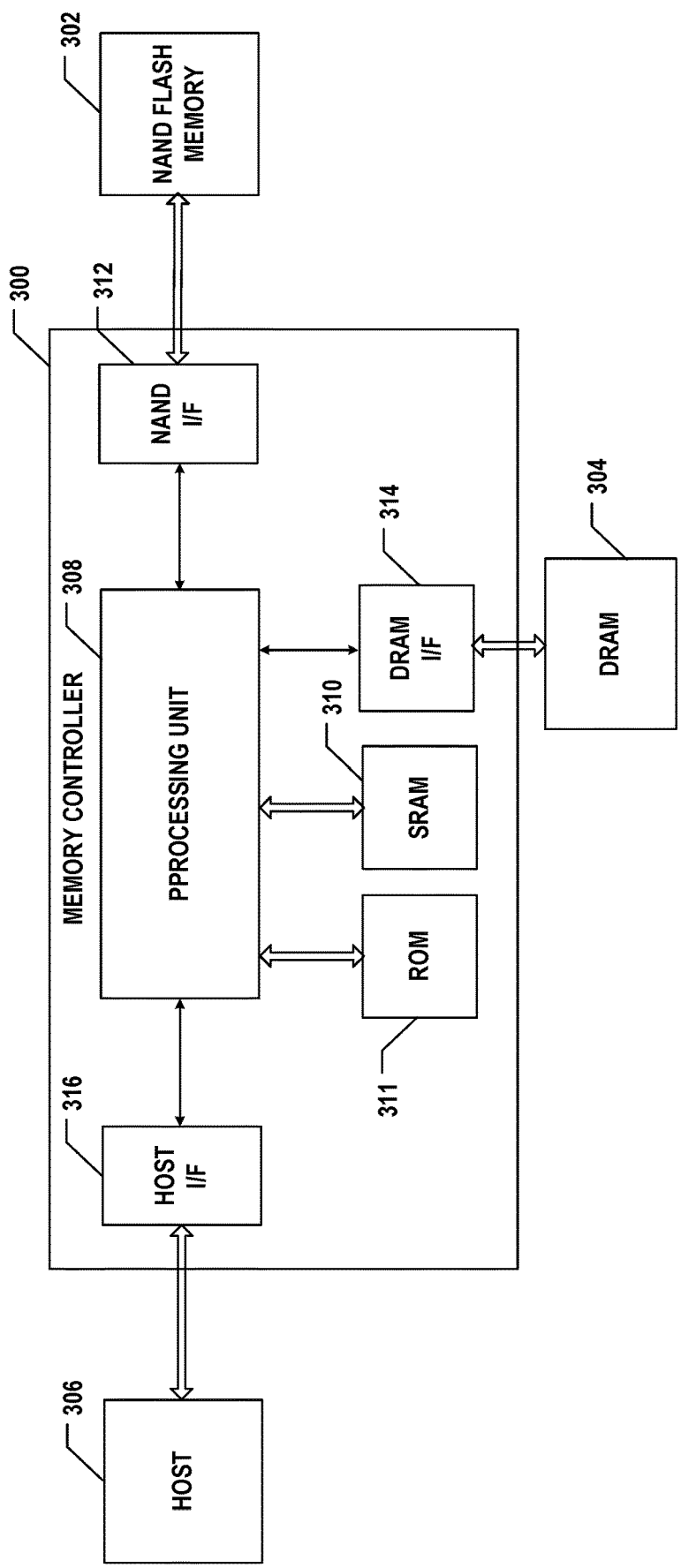
FIG. 3 illustrates a block diagram of a memory controller, according to some aspects of the present disclosure.

FIG. 3 illustrates a block diagram of a memory controller 300, according to some aspects of the present disclosure. Memory controller 300 may be one example of memory controller 106 in FIG. 1. As shown in FIG. 3, memory controller 300 can include a processing unit 308, an SRAM 310, and a read-only memory (ROM) 311. In some implementations, processing unit 308 is implemented by microprocessors (e.g., digital signal processors (DSPs)) or microcontrollers (a.k.a. microcontroller units (MCUs)) that execute firmware and/or software modules to perform the various functions described herein. The various firmware modules in memory controller 300 described herein can be implemented as firmware codes or instructions stored in ROM 311 and executed by processing unit 308. In some implementations, processing unit 308 includes one or more hardware circuits, for example, fixed logic units such as a logic gate, a multiplexer, a flip-flop, a state machine, field-programmable gate arrays (FPGAs), programmable logic devices (PLDs). For example, the hardware circuits may include dedicated circuits performing a given logic function that is known at the time of device manufacture, such as application-specific integrated circuits (ASICs).

As shown in FIG. 3, memory controller 300 can also include various input/output (I/O) interfaces (I/F), such as a NAND interface 312, a DRAM interface 314, and a host interface 316 operatively coupled to NAND Flash memory 302 (e.g., an example of non-volatile memory devices), DRAM 304 (e.g., an example of volatile memory devices), and a host 306 (e.g., an example of host 108), respectively. NAND interface 312, DRAM interface 314, and host interface 316 can be configured to transfer data, command, clock, or any suitable signals between processing unit 308 and NAND Flash memory 302, DRAM 304, and host 306, respectively. NAND interface 312, DRAM interface 314, and host interface 316 can implement any suitable communication protocols facilitating data transfer, communication, and management, such as the NVMe protocol and PCI-E protocol, double data rate (DDR) protocol, to name a few.

As described above, both SRAM 310 and DRAM 304 may be considered as volatile memory devices that can be controlled and accessed by memory controller 300 in a memory system. Consistent with the scope of the present disclosure, a cache can be implemented as part of volatile memory devices, for example, by SRAM 310 and/or DRAM 304. It is understood that although FIG. 3 shows that SRAM 310 is within memory controller 300 and DRAM 304 is outside of memory controller 300, in some examples, both SRAM 310 and DRAM 304 may be within memory controller 300 or outside of memory controller 300.

Figure 4:
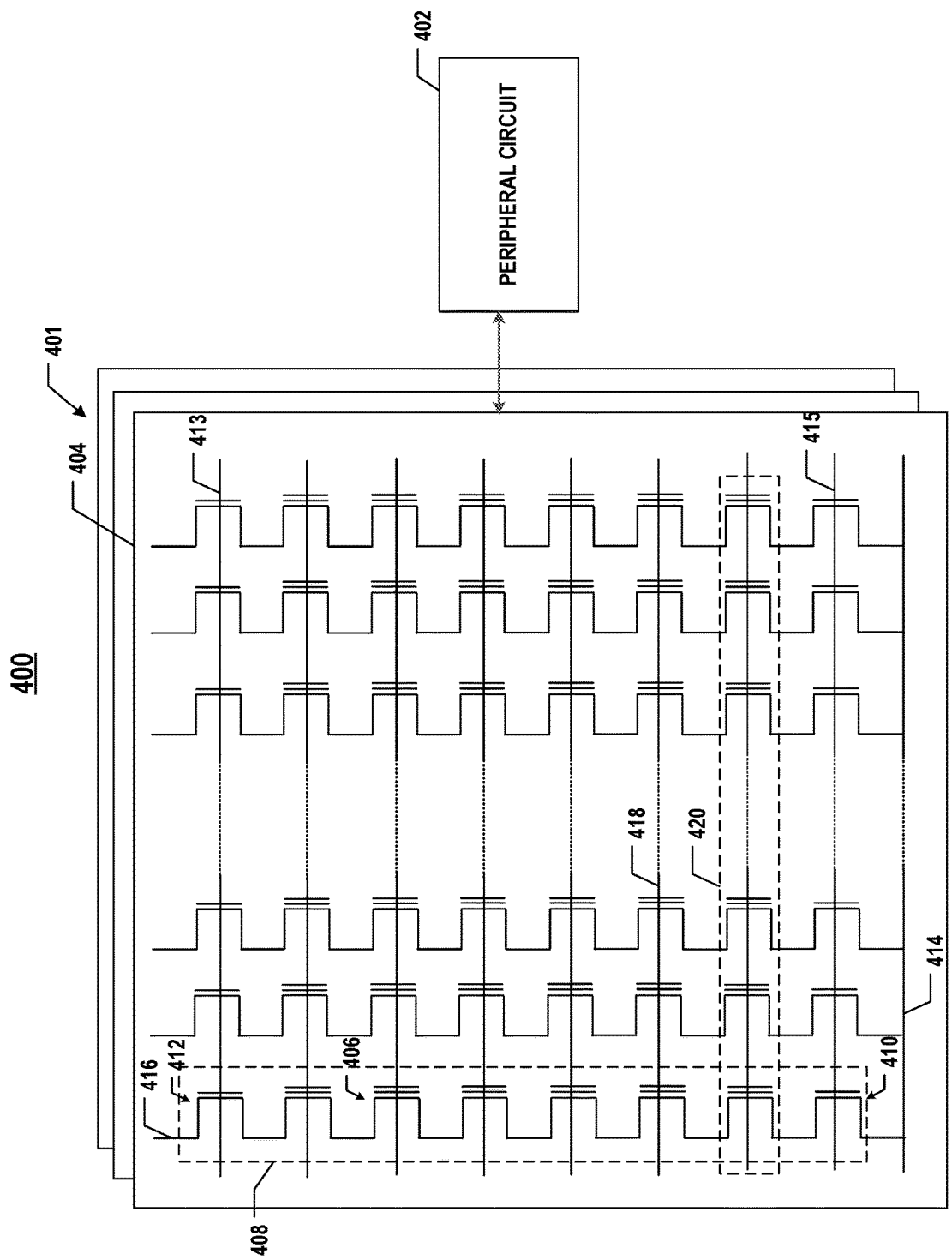
FIG. 4 illustrates a schematic diagram of a NAND Flash memory device including peripheral circuits, according to some aspects of the present disclosure.

FIG. 4 illustrates a schematic circuit diagram of a NAND Flash memory device 400 including peripheral circuits 402, according to some aspects of the present disclosure. NAND Flash memory device 400 may be one example of NAND Flash memory 302 in FIG. 3. NAND Flash memory device 400 can include a memory cell array 401 and peripheral circuits 402 operatively coupled to memory cell array 401. Memory cells 406 in memory cell array 401 are provided in the form of an array of NAND memory strings 408 each extending vertically above a substrate (not shown). In some implementations, each NAND memory string 408 includes a plurality of memory cells 406 operatively coupled in series and stacked vertically. Each memory cell 406 can hold a continuous, analog value, such as an electrical voltage or charge, which depends on the number of electrons trapped within a region of memory cell 406. Each memory cell 406 can be either a floating gate type of memory cell including a floating-gate transistor or a charge trap type of memory cell including a charge-trap transistor.

In some implementations, each memory cell 406 is a single-level cell (SLC) that has two possible levels (memory states) and thus, can store one bit of data. For example, the first state "0" can correspond to a first range of threshold voltages, and the second state "1" can correspond to a second range of threshold voltages. In some implementations, each memory cell 406 is an xLC that is capable of storing more than a single bit of data in more than four levels. For example, the xLC may store two bits per cell (a.k.a., multi-level cell (MLC)), three bits per cell (a.k.a., triple-level cell (TLC)), or four bits per cell (a.k.a. quad-level cell (QLC)). Each xLC can be programmed to assume a range of possible nominal storage values (i.e., corresponding to $2^N$ pieces of N-bits data). In some implementations, each memory cell 406 is set to one of $2^N$ levels corresponding to a piece of N-bits data, where N is an integer greater than 2.

As shown in FIG. 4, each NAND memory string 408 can also include a source select gate (SSG) transistor 410 at its source end and a drain select gate (DSG) transistor 412 at its drain end. SSG transistor 410 and DSG transistor 412 can be configured to activate select NAND memory strings 408 (columns of the array) during read and program operations. In some implementations, the sources of NAND memory strings 408 in the same block 404 are coupled through a same source line (SL) 414, e.g., a common SL. In other words, all NAND memory strings 408 in the same block 404 have an array common source (ACS), according to some implementations. The drain of each NAND memory string 408 is coupled to a respective bit line 416 from which data can be read or written via an output bus (not shown), according to some implementations. In some implementations, each NAND memory string 408 is configured to be selected or deselected by applying a select voltage or a deselect voltage to the gate of respective DSG transistor 412 through one or more DSG lines 413 and/or by applying a select voltage or a deselect voltage to the gate of respective SSG transistor 410 through one or more SSG lines 415.

As shown in FIG. 4, NAND memory strings 408 can be organized into multiple blocks 404, each of which can have a common source line 414, e.g., coupled to the ACS. In some implementations, each block 404 is the basic data unit for erase operations, i.e., all memory cells 406 on the same block 404 are erased at the same time. To erase memory cells 406 in a select block 404, source lines 414 coupled to select block 404 as well as unselect blocks 404 in the same plane as select block 404 can be biased with an erase voltage (Vers), such as a high positive bias voltage (e.g., 20 V or more).

Memory cells 406 of adjacent NAND memory strings 408 can be coupled through word lines 418 that select which row of memory cells 406 is affected by read and program operations. In some implementations, each word line 418 is coupled to a physical page 420 of memory cells 406, which is the basic data unit for read and write (program) operations. The size of one physical page 420 in bits can relate to the number of NAND memory strings 408 coupled by word line 418 in one block 404. Each word line 418 can include a plurality of control gates (gate electrodes) at each memory cell 406 in respective physical page 420 and a gate line coupling the control gates.

Peripheral circuits 402 can be operatively coupled to memory cell array 401 through bit lines 416, word lines 418, source lines 414, SSG lines 415, and DSG lines 413. Peripheral circuits 402 can include any suitable analog, digital, and mixed-signal circuits for facilitating the operations of memory cell array 401 by applying and sensing voltage signals and/or current signals to and from each select memory cell 406 through bit lines 416, word lines 418, source lines 414, SSG lines 415, and DSG lines 413. Peripheral circuits 402 can include various types of peripheral circuits formed using complementary metal-oxide-semiconductor (CMOS) technologies.

Figure 5:
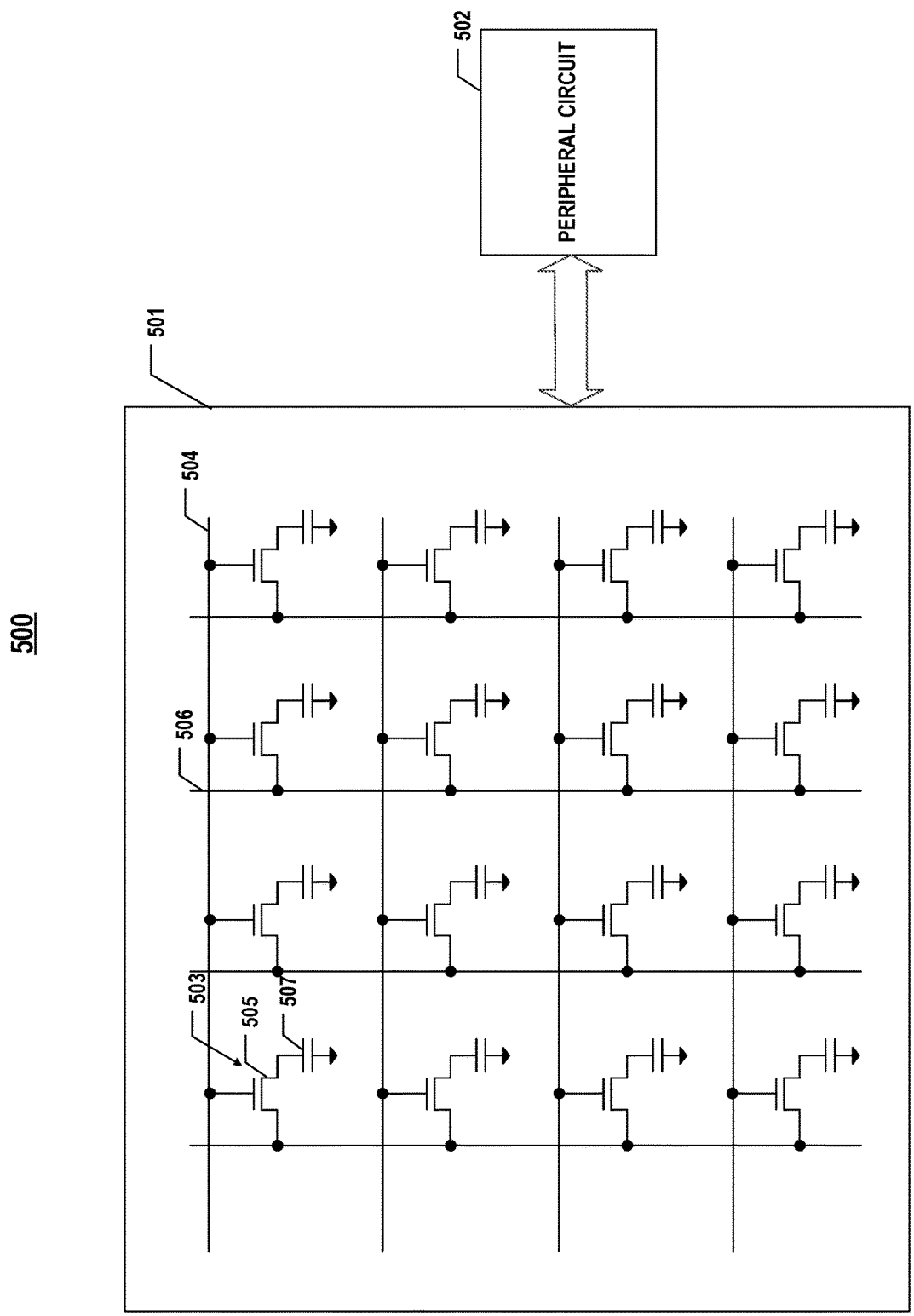
FIG. 5 illustrates a schematic diagram of a DRAM device including peripheral circuits, according to some aspects of the present disclosure.

FIG. 5 illustrates a schematic circuit diagram of a DRAM device 500 including peripheral circuits 502, according to some aspects of the present disclosure. DRAM device 500 may be one example of DRAM 304 in FIG. 3. DRAM device 500 can include a memory cell array 501 and peripheral circuits 502 operatively coupled to memory cell array 501. Memory cells 503 can be arranged in memory cell array 501 having rows and columns. DRAM device 500 requires periodic refreshing of memory cells 503. In some implementations, each memory cell 503 includes a capacitor 507 for storing a bit of data as a positive or negative electrical charge as well as a transistor 505 that controls access to capacitor 507. That is, each memory cell 503 shown in FIG. 5 is a one-transistor, one-capacitor (1T1C) cell, according to some implementations.

DRAM device 500 can include word lines 504 coupling peripheral circuits 502 and memory cell array 501 for controlling the switch of transistors 505 in memory cells 503 located in a row, as well as bit lines 506 coupling peripheral circuits 502 and memory cell array 501 for sending data to and/or receiving data from memory cells 503 located in a column. That is, each word line 504 is coupled to a respective row of memory cells 503, and each bit line 506 is coupled to a respective column of memory cells 503. The gate of transistor 505 can be coupled to word line 504, one of the source and the drain of transistor 505 can be coupled to bit line 506, the other one of the source and the drain of transistor 505 can be coupled to one electrode of capacitor 507, and the other electrode of capacitor 507 can be coupled to the ground.

Peripheral circuits 502 can be coupled to memory cell array 501 through bit lines 506, word lines 504, and any other suitable metal wirings. Peripheral circuits 502 can include any suitable circuits for facilitating the operations of memory cell array 501 by applying and sensing voltage signals and/or current signals through word lines 504 and bit lines 506 to and from each memory cell 503. Peripheral circuits 502 can include various types of peripheral circuits formed using CMOS technologies.

Figure 6:
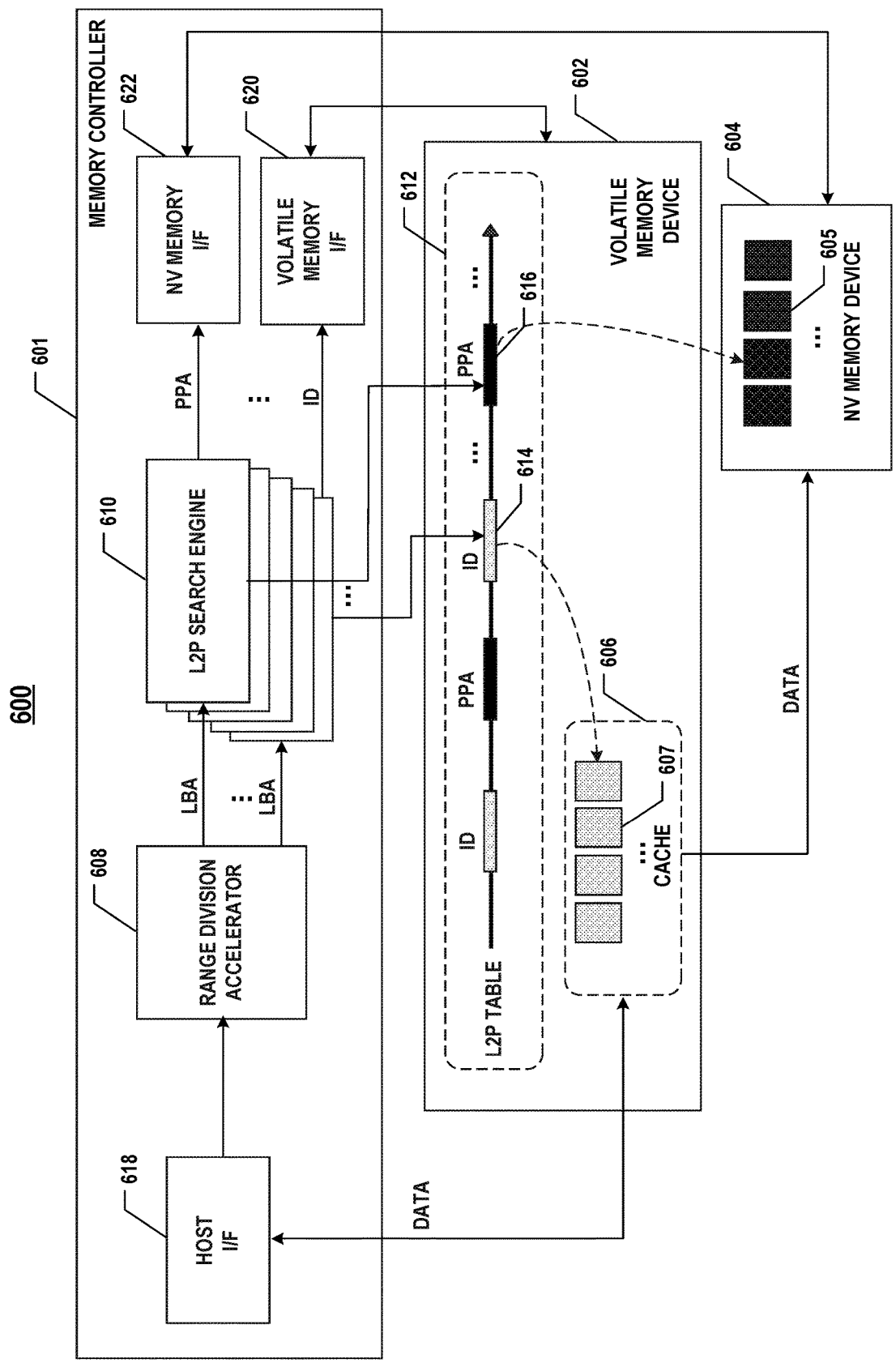
FIG. 6 illustrates a detailed schematic diagram of a memory system performing data search, according to some aspects of the present disclosure.

FIG. 6 illustrates a detailed schematic diagram of a memory system 600 performing data search, according to some aspects of the present disclosure. Memory system 600 may be one example of memory system 102 in FIG. 1. As shown in FIG. 6, memory system 600 can include a memory controller 601, a volatile memory device 602, and a non-volatile memory device 604. Memory controller 601 may be one example of memory controller 106 in FIG. 1. Volatile memory device 602 and non-volatile memory device 604 may be examples of memory devices 104 in FIG. 1. In some implementations, volatile memory device 602 includes DRAM (e.g., DRAM device 500 in FIG. 5), and non-volatile memory device 604 includes NAND Flash memory (e.g., NAND Flash memory device 400 in FIG. 4). Data from a host (not shown, e.g., host 108 in FIG. 1) can be stored in volatile memory device 602 as "hot data" or non-volatile memory device 604 as "cold data." It is understood that in some examples, the "hot data" may be stored in non-volatile memory device 604 while the "cold data" may be stored in volatile memory device 602, or both the "hot data" and the "cold data" may be stored in volatile memory device 602 or in non-volatile memory device 604. As described above, "hot data" refers to frequently used and/or recently accessed data, which, for example, is stored in a cache 606 in volatile memory device 602. In contrast, "cold data" refers to data, which, for example, is stored in non-volatile memory device 604, such as data that is flushed from cache 606 to non-volatile memory device 604 under certain conditions (e.g., cache 606 is full of data, data that has not been accessed or used for a time period, etc.) In some implementations, memory controller 601 is further configured to cache a piece of host/user data in volatile memory device 602 or flush the piece of host/user data from volatile memory device 602 to non-volatile memory device 604.

To enable cold data search and access, non-volatile memory device 604 can be divided into multiple memory regions 605 each has a unique physical address. In some implementations, each memory region 605 includes one or more logical pages, for example, a portion (e.g., ½, ¼. or ⅛) of one physical page 420 of NAND Flash memory device 400. For example, the size of each memory region 605 may be 4,096 bytes. It is understood that memory region 605 may correspond to any suitable memory cell groups in non-volatile memory device 604 besides pages, such as portions of a page, blocks (e.g., blocks 404 of NAND Flash memory device 400), etc. The physical address of memory region 605 can be a physical page address (PPA), for example, when memory region 605 corresponds to a page of non-volatile memory device 604.

Consistent with the scope of the present disclosure, to enable hot data search and access, cache 606 of volatile memory device 602 can be divided into multiple memory blocks 607 each having a unique identifier (ID, a.k.a., memory block ID). In some implementations, each memory block 607 includes one or more pages, for example, rows or columns of memory cells 503 of DRAM device 500. In some implementations, to enable uniform data search between non-volatile memory device 604 and volatile memory device 602, the size of each memory region 605 and the size of each memory block 607 may be the same. It is understood that in some examples, the size of each memory region 605 and the size of each memory block 607 may be different. For example, the size of each memory block 607 may be 4,096 bytes as well. It is understood that memory block 607 may correspond to any suitable memory cell groups in volatile memory device 602 besides pages, such as portions of a page, codewords, etc.

Cache 606 can be a portion of volatile memory device 602 that temporarily stores (caches) the frequently used and/or recently accessed data (i.e., hot data) to speed up the read and write operations of non-volatile memory device 604. Any suitable caching algorithms can be used to determine which data should be stored in cache 606 and when it should be replaced, including, for example, least recently used (LRU), most recently used (MRU), and first-in, first-out (FIFO). In some implementations, data from the host (host/user data) is first cached in cache 606 of volatile memory device 602 as hot data, and flushed to non-volatile memory device 604 as cold data under certain conditions based on the caching algorithm. For example, when the size of the data in cache 606 reaches a preset threshold (maximum caching size), data in cache 606 may be flushed to non-volatile memory device 604. Cache 606 can be implemented by any suitable type of volatile memory device 602, for example, DRAM 304 and/or SRAM 310 in FIG. 3.

Consistent with the scope of the present disclosure, to enable uniform search and access of both hot data and cold data, a uniform, expanded L2P mapping table 612 can be maintained and stored in volatile memory device 602 to map the logical addresses of data, not only to the physical addresses 616 (e.g., PPAs) of memory regions 605 in non-volatile memory device 604, respectively, but also to the IDs 614 of memory blocks 607 in cache 606 of volatile memory device 602, respectively. The logical addresses can identify the host/user data and be known to memory controller 601. In some implementations, a logical address indicates the basic logical unit of data for each read or write operation, such as a logical block address (LBA). In some implementations, to enable uniform data search between non-volatile memory device 604 and volatile memory device 602, the size of each memory region 605, the size of each memory block 607, and the size of the data corresponding to each logical address may be the same. For example, the size of the data corresponding to each logical address may be 4,096 bytes as well. Since memory controller 601 operates based on logical addresses, as opposed to physical addresses (e.g., physical addresses 616 or IDs 614), L2P mapping table 612 can be used to enable the conversion between logical addresses and physical addresses across both non-volatile memory device 604 and volatile memory device 602 in a uniform manner, as described below in detail.

L2P mapping table 612 can be stored in any suitable type of volatile memory device 602, for example, DRAM 304 in FIG. 3. In some implementations, the same volatile memory device 602, such as DRAM 304 in FIG. 3, includes both cache 606 and L2P mapping table 612. It is understood that in some examples, cache 606 and L2P mapping table 612 may be included in different volatile memory devices 602. For example, SRAM 310 may include cache 606, while DRAM 304 may include L2P mapping table 612. Although L2P mapping table 612 is shown in FIG. 6 as being outside of cache 606, it is understood that in some examples, L2P mapping table 612 may be stored in cache 606 as well.

Figure 7:
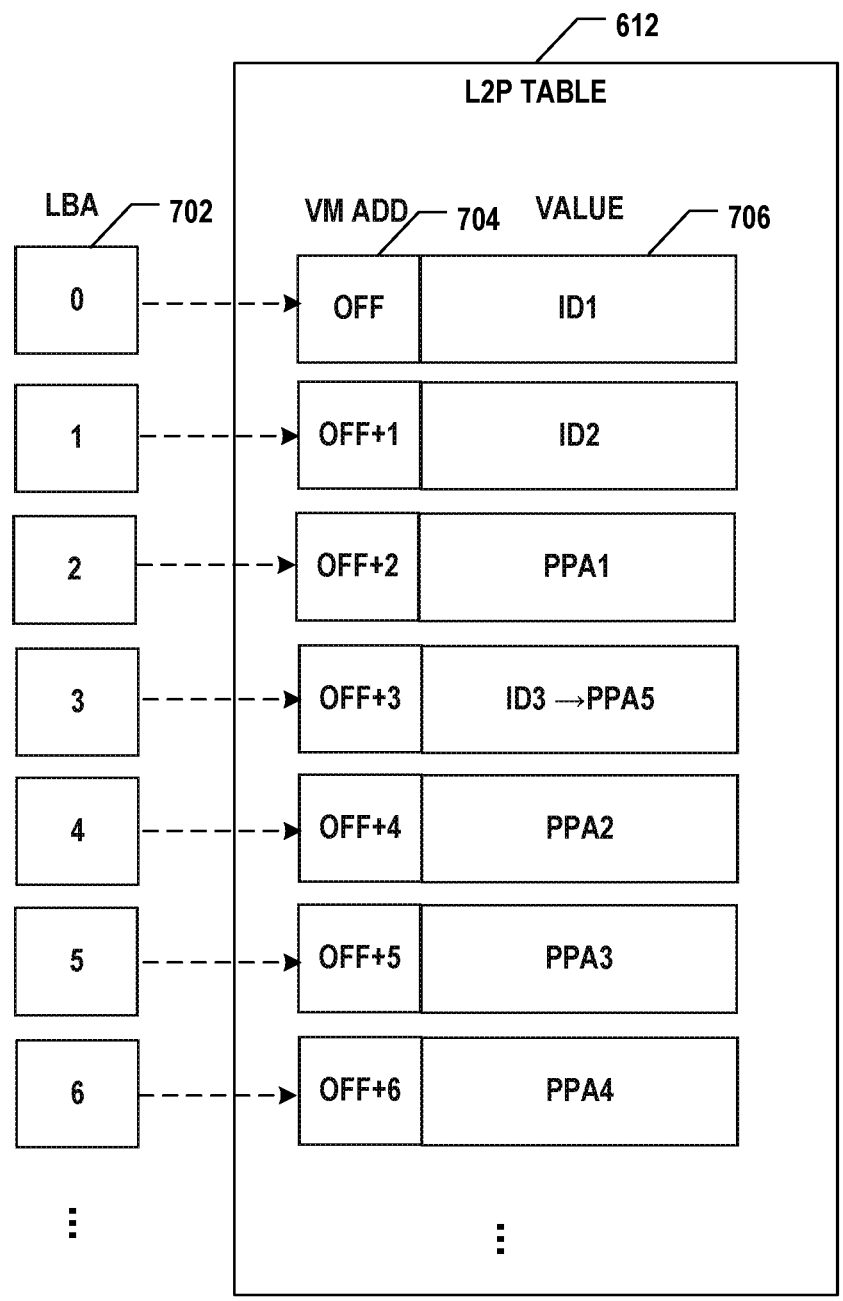
FIG. 7 illustrates an L2P mapping table, according to some aspects of the present disclosure.

L2P mapping table 612 can be stored in volatile memory device 602 with the addresses in volatile memory device 602. For example, as shown in FIG. 7, L2P mapping table 612 may include addresses 704 in volatile memory device 602 (VM Add) each associated with a value 706. Values 706 may include two types of information: IDs 614 of memory blocks 607 in cache 606 (e.g., ID1, ID2, ID 3, etc.), and physical addresses 616 (PPAs) of memory regions 605 in non-volatile memory device 604 (e.g., PPA1, PPA2, PPA3, PPA4, etc.). As shown in FIG. 7, L2P mapping table 612 may also map logical addresses 702 (LBAs) of host/user data to IDs 614 of memory blocks 607 in cache 606 and physical addresses 616 of memory regions 605 in non-volatile memory device 604 through addresses 704. For example, for each piece of host/user data, a corresponding address 704 of L2P mapping table 612 in volatile memory device 602 may be determined based on the respective LBA 702 associated with the piece of host/user data. In one example as shown in FIG. 7, each address 704 may be calculated by adding an address offset (OFF) to the respective LBA 702 (e.g., 0, 1, 2. 3, 4, 5, 6, etc.). The address offset can be determined, for example, based on where L2P mapping table 612 is stored in volatile memory device 602. The corresponding value 706 at the determined address 704 of L2P mapping table 612 may thus be determined, which indicates either an ID 614 of a memory block 607 in cache or a physical address 616 of a memory region in non-volatile memory device 604 through addresses 704. As such, LBAs 702 of host/user data may be mapped to IDs 614 of memory blocks 607 in cache 606 and physical addresses 616 of memory regions 605 in non-volatile memory device 604, respectively, by L2P mapping table 612.

Referring back to FIG. 6, memory controller 601 can include multiple I/O interfaces, including a volatile memory interface 620 operatively coupled to volatile memory device 602, a non-volatile memory interface 622 operatively coupled to non-volatile memory device 604, and a host interface 618 operatively coupled to cache 606 of volatile memory device 602 and the host (not shown). Examples of those I/O interfaces may include DRAM interface 314, NAND interface 312, and host interface 316 in FIG. 3, which may implement any suitable communication protocols facilitating data transfer, communication, and management, such as the NVMe protocol and PCI-E protocol, DDR protocol, to name a few.

Host interface 618 can be configured to receive write requests and read requests from the host. Each write request can be indicative of a piece of data associated with a logical address (e.g., LBA) to be written to memory system 600. Similarly, each read request can be indicative of a piece of data associated with a logical address (e.g., LBA) to be read from memory system 600. In some implementations, in response to receiving a write request or a read request, host interface 618 is also configured to fetch the piece of data from the host to temporarily store (cache) the piece of data in cache 606, or vice versa. For example, host interface 618 may include a direct memory access (DMA) unit that accesses data from and to cache 606.

Non-volatile memory interface 622 can be configured to enable memory controller 601 to access data stored in non-volatile memory device 604 based on the physical addresses (e.g., PPAs) of memory regions 605. Volatile memory interface 620 can be configured to enable memory controller 601 to access data stored in volatile memory device 602, such as to maintain L2P mapping table 612 and to access data in cache 606. In some implementations, volatile memory interface 620 is configured to convert IDs 614 of memory blocks 607 in cache 606 to physical addresses of volatile memory device 602 that can be used directly by memory controller 601 for operating the memory cells of volatile memory device 602. In other words, while IDs 614 of memory blocks 607 in cache 606 can be used to facilitate the hot data search by L2P mapping table 612, memory controller 601 can still use the physical addresses of volatile memory device 602 to access data in volatile memory device 602. As a result, volatile memory device 602 does not need to be modified to accommodate the usage of IDs 614 of memory blocks 607 for hot data search, according to some implementations.

As shown in FIG. 6, memory controller 601 can further include a range division accelerator 608 and one or more L2P search engines 610 operatively coupled to volatile memory device 602, non-volatile memory interface 622, and volatile memory interface 620. In some implementations, range division accelerator 608 and L2P search engines 610 are firmware modules implemented by firmware codes/instructions stored in a memory (e.g., ROM 311 in FIG. 3) and executed by a processing unit (e.g., processing unit 308 in FIG. 8). In some implementations, range division accelerator 608 and L2P search engines 610 are hardware modules implemented by dedicated circuits, such as ASICs, for performing their dedicated functions described herein. The hardware implementation of range division accelerator 608 and L2P search engines 610 can improve search parallelism and reduce firmware overhead, thereby further improving data search performance.

Range division accelerator 608 can be configured to generate data search requests based on the read and write requests from the host via host interface 618, and assign the search requests to L2P search engines 610. That is, range division accelerator 608 can divide the read requests or write requests into search requests to be handled by multiple L2P search engineers 610 in parallel, for example, based on the different logical addresses associated with the data of the read requests or write requests. For example, for each search request, range division accelerator 608 may identify an idle L2P search engine 610 to handle the search request. In some implementations, in response to receiving a write request indicative of a piece of data associated with a logical address (e.g., LBA), range division accelerator 608 is configured to assign the piece of the data to one of memory blocks 607 in cache 606 with a unique one of IDs 614, which triggers host interface 618 to fetch the corresponding piece of data from the host to the corresponding memory block 607 in cache 606.

L2P search engines 610 can be configured to handle the search requests and maintain L2P mapping table 612 stored in volatile memory device 602 through volatile memory interface 620 based on the handling of the search requests. In some implementations, a single L2P mapping table 612 is maintained for memory system 600, and multiple L2P search engines 610 are configured to maintain the same L2P mapping table 612 and use the same L2P mapping table 612 for hot and cold data search. For example, multiple L2P search engines 612 may be configured to 0search multiple pieces of data, respectively, in parallel based on the same L2P mapping table 612. It is understood that in some examples, a single L2P search engine 610 may be used to handle the search requests. In some implementations, in response to host interface 618 fetching a piece of data from the host to the corresponding memory block 607 in cache 606 in response to the write request, L2P search engine 610 is configured to update L2P mapping table 612 to map the logical address (e.g., LBA) associated with the piece of data to the unique ID 614 of the corresponding memory block 607. For example, as shown in FIG. 7, assuming LBA 702 of the piece of data is "3," value 706 may be updated by search engine 610 to become "ID3," which is the unique ID 614 of the corresponding memory block 607. Value 706 may be stored at address 704 "OFF+3" of L2P mapping table 612 in volatile memory device 602. In some implementations, in response to the piece of cached data in cache 606 being flushed to one of memory regions 605 in non-volatile memory device 604 with a unique one of physical addresses 616 (e.g., PPA), L2P search engine 610 is further configured to update L2P mapping table 612 to map the logical address (e.g., LBA) associated with the piece of data to the unique physical address 616 of the corresponding memory region 605. For example, as shown in FIG. 7, assuming LBA 702 of the piece of data is "3," value 706 may be updated by L2P search engine 610 to become "PPA5," which is the unique physical address 616 of the corresponding memory region 605, since the piece of data associated with LBA 3 has been moved from ID3 in cache 606 to PPA5 in non-volatile memory device 604.

In some implementations, in response to receiving a search request for a read request indicative of a piece of data with a logical address (e.g., LBA), L2P search engine 610 is configured to search the piece of data based on the logical address and L2P mapping table 612. L2P mapping table 612 can be configured to determine an address of L2P mapping table 612 in volatile memory device 602 based on the logical address, and then determine the value at the address of L2P mapping table 612. The value can be an ID 614 of memory block 607 in cache or a physical address 616 of memory region 605 in non-volatile memory device 604. In one example, as shown in FIG. 7, assuming LBA 702 of the piece of data is "0," search engine 610 may first add LBA 702 "0" to the address offset "OFF" to obtain address 704 "OFF," and then identify value 706 at address 704 "OFF" to be "ID1," meaning that the piece of data to be read is hot data currently cached in memory block ID1 in cache 606. In another example, as shown in FIG. 7, assuming LBA 702 of the piece of data is "2," L2P search engine 610 may first add LBA 702 "2" to the address offset "OFF" to obtain address 704 "OFF+2," and then identify value 706 at address 704 "OFF+2" to be "PPA1," meaning that the piece of data to be read is cold data currently stored in memory region PPA1 in non-volatile memory device 604.

In some implementations, in response to identifying the ID 614 of memory block 607 in cache 606, L2P search engine 610 provides the identified ID 614 to volatile memory interface 620, and volatile memory interface 620 converts the ID 614 to a corresponding physical address in volatile memory device 602, such that host interface 618 can fetch the piece of data from the corresponding physical address in volatile memory device 602, for example, using DMA. In some implementations, in response to identifying the physical address 616 of memory region 605 in non-volatile memory device 604, L2P search engine 610 provides the identified physical address 616 (e.g., PPA) to non-volatile memory interface 622, such that non-volatile memory interface 622 can fetch the piece of data from the corresponding physical address in non-volatile memory device 604.

Figure 8:
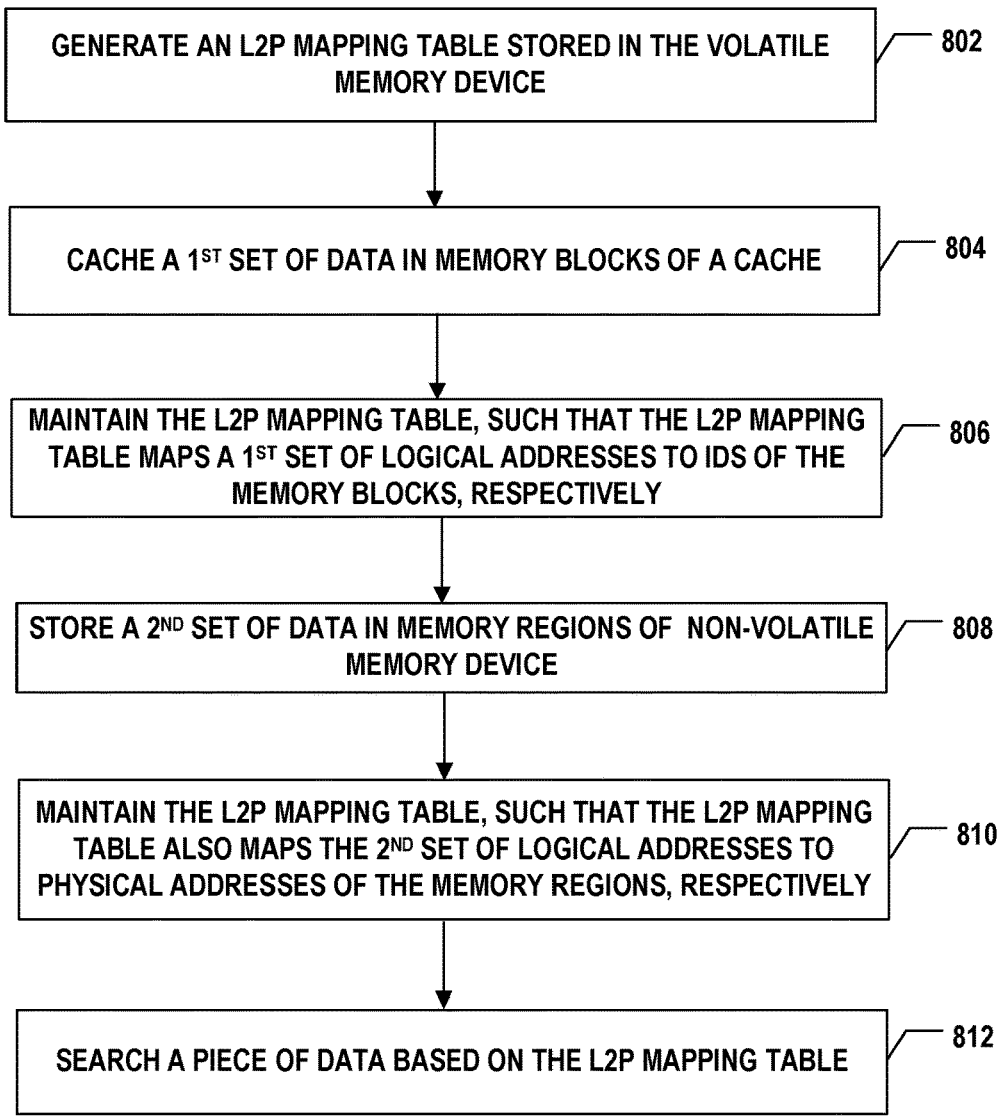
FIG. 8 illustrates a flowchart of a method for operating a memory controller, according to some aspects of the present disclosure.

FIG. 8 illustrates a flowchart of a method 800 for operating a memory controller, according to some aspects of the present disclosure. The memory controller may be any suitable memory controller disclosed herein, such as memory controller 601. It is understood that the operations shown in method 800 may not be exhaustive and that other operations can be performed as well before, after, or between any of the illustrated operations. Further, some of the operations may be performed simultaneously, or in a different order than shown in FIG. 8.

The memory controller is operatively coupled to a volatile memory device and a non-volatile memory device. The volatile memory device can include a cache. The cache is divided into memory blocks each has a respective unique one of IDs. The non-volatile memory device is divided into memory regions each having a respective unique one of physical addresses. For example, as shown in FIG. 6, volatile memory device 602 may include cache 606, which may be divided into memory blocks 607 each having a unique ID 614, and non-volatile memory device 604 may be divided into memory regions 605 each having a unique physical address 616.

Referring to FIG. 8, method 800 starts at operation 802, in which an L2P mapping table is generated and stored in the volatile memory device. For example, as shown in FIG. 6, memory controller 601 may generate L2P mapping table 612 during the initiation of memory system 600 and store L2P mapping table 612 in volatile memory device 602 during the operation of memory system 600. For example, as shown in FIG. 7, L2P mapping table 612 may include values 706 at each address 704 thereof, which may be mapped to LBAs 702, respectively.

Method 800 proceeds to operation 804, as illustrated in FIG. 8, in which a first set of data is cached in the memory blocks of the cache. The first set of data is associated with a first set of logical addresses, respectively. For example, as shown in FIG. 6, memory controller 601 may cache pieces of host/user data in memory blocks 607, respectively, in cache 606. Each piece of host/user data may be associated with a respective one of logical addresses (e.g., LBAs). In one example, host interface 618 of memory controller 601 may fetch host/user data from the host to cache the host/user data in memory blocks 607 using DMA.

Method 800 proceeds to operation 806, as illustrated in FIG. 8, in which the L2P mapping table is maintained, such that the L2P mapping table maps the first set of logical addresses to the IDs of the memory blocks of the cache, respectively. For example, as shown in FIGS. 6 and 7, memory controller 601 may maintain L2P mapping table 612, such that a set of LBAs 702 may be mapped to IDs 614 of memory blocks 607 via addresses 704, respectively.

Method 800 proceeds to operation 808, as illustrated in FIG. 8, in which a second set of data is stored in the memory regions of the non-volatile memory device. The second set of data is associated with a second set of logical addresses, respectively. For example, as shown in FIG. 6, memory controller 601 may store pieces of host/user data in memory regions 605, respectively, in non-volatile memory device 604. Each piece of host/user data may be associated with a respective one of logical addresses (e.g., LBAs). In one example, the pieces of host/user data may be flushed from cache 606 to non-volatile memory device 604.

Method 800 proceeds to operation 810, as illustrated in FIG. 8, in which the L2P mapping table is maintained, such that the L2P mapping table maps the second set of logical addresses to the physical addresses of the memory regions of the non-volatile memory device, respectively. For example, as shown in FIGS. 6 and 7, memory controller 601 may maintain L2P mapping table 612, such that another set of LBAs 702 may be mapped to physical addresses 616 (e.g., PPAs) of memory regions 605 via addresses 704, respectively.

Method 800 proceeds to operation 812, as illustrated in FIG. 8, in which a piece of data is searched based on the L2P mapping table. As shown in FIG. 6, multiple L2P search engines 610 of memory controller 601 may perform hot data search and cold data search of multiple pieces of data in parallel based on the logical addresses of the multiple pieces of data and L2P mapping table 612.

In some implementations, to search the piece of data, an address of the L2P mapping table in the volatile memory device is determined based on a logical address associated with the piece of the data, and a value at the address of the L2P mapping table is determined. For example, as shown in FIGS. 6 and 7, each L2P search engine 610 may calculate address 704 of L2P mapping table 612 based on LBA 702 and the address offset, and identify value 706 at address 704 to be either an ID or a physical address (e.g., PPA). In some implementations, to search the piece of data, in response to the value being one of the IDs of the memory blocks in the volatile memory device, the piece of the data is fetched from the memory block in the volatile memory device having the ID. In some implementations, to search the piece of data, in response to the value being one of the physical addresses of the memory regions in the non-volatile memory device, the piece of the data is fetched from the memory region in the non-volatile memory device having the physical address. For example, as shown in FIGS. 6 and 7, if L2P search engine 610 identifies value 706 at address 704 to an ID 614, host interface 618 may fetch the piece of data from memory block 607 in cache 606 that has the identified ID 614, for example, using DMA. In contrast, if L2P search engine 610 identifies value 706 at address 704 to a physical address 616 (e.g., PPA), non-volatile memory interface 622 may fetch the piece of data from memory region 605 in non-volatile memory device 604 that has the identified physical address 616.

Figure 9:
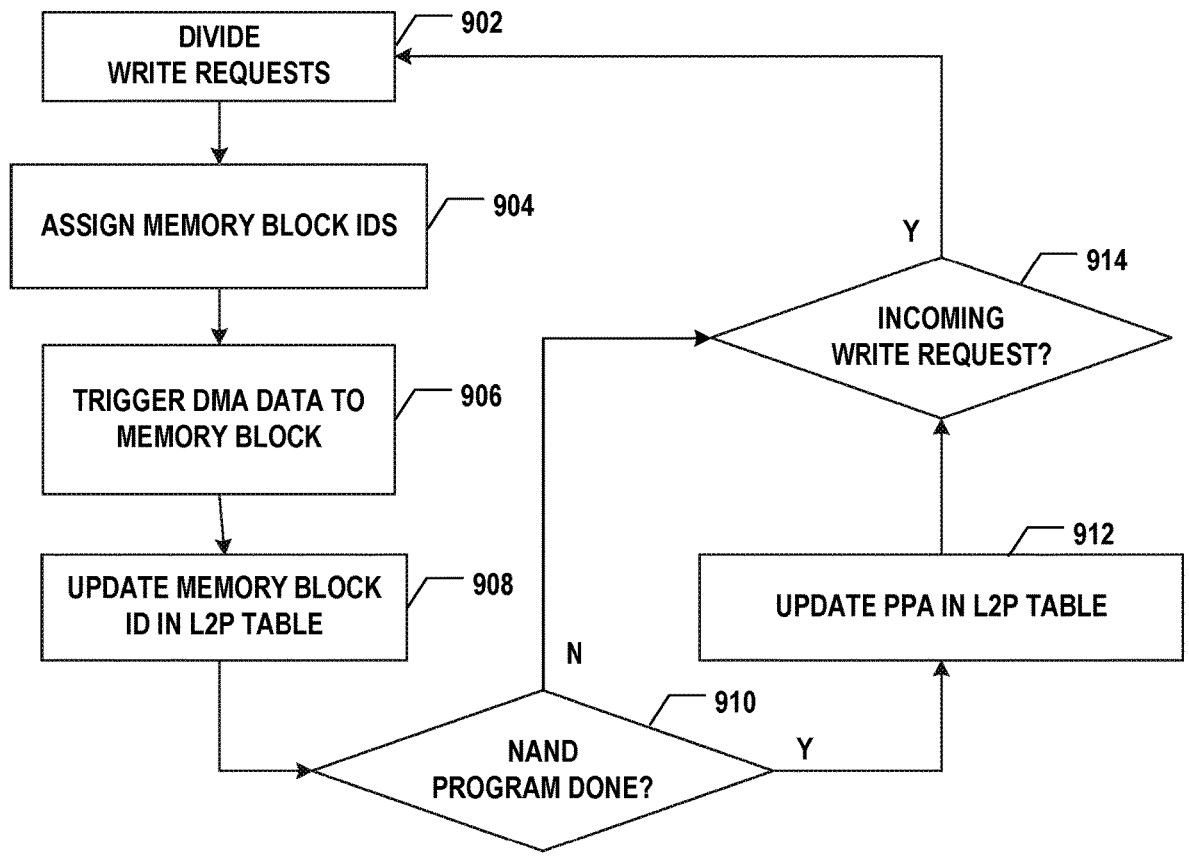
FIG. 9 illustrates a flowchart of a method for handling write requests, according to some aspects of the present disclosure.

In some implementations, in response to receiving a write request indicative of a piece of the first set of data associated with a first logical address of the first set of logical addresses, the piece of the first set of data is assigned to a first memory block of the memory blocks having a first ID of the IDs. For example, as shown in FIG. 9, at 902. write requests may be divided by range division accelerator 608 into multiple search requests each associated with a piece of host/user data and a logical address thereof. For example, at 904, memory block IDs may be assigned by range division accelerator 608 to the pieces of host/user data, respectively, such that each piece of host/user data may be associated with a respective memory block ID. In some implementations, the piece of the first set of data is fetched to cache the piece of the first set of data into the first memory block. For example, at 906, range division accelerator 608 may trigger host interface 618 to fetch each piece of host/user data to the respective memory block using DMA.

In some implementations, in response to fetching the piece of the first set of data to the first memory block, the L2P mapping table is updated to map the first logical address to the first ID. For example, at 908, the memory block ID where the piece of host/user data is cached may be updated by L2P search engine 610 in L2P mapping table 612 to be mapped to the logical address of the piece of host/user data. In some implementations, in response to the piece of the data is flushed from the first memory block of the cache to a memory region of the non-volatile memory device having a physical address, the L2P mapping table is updated to map the first logical address to the physical address. For example, at 910, whether the NAND Flash memory programming is done may be checked. The NAND Flash memory programming may be performed by flushing the cached host/user data from the cache to the NAND Flash memory. Once the NAND Flash memory programming is done, each piece of host/user data may be stored in a respective one of memory regions each associated with a PPA. If the answer to 910 is yes, at 912, the PPA where the piece of host/user data is stored in the NAND Flash memory may be updated by L2P search engine 610 in L2P mapping table 612 to be mapped to the logical address of the piece of host/user data, replacing the memory block ID. At 914, whether new incoming write requests are received may be checked to determine whether the process may continue from 902 again for the new incoming write requests. If the answer to 910 is no, the process may proceed to 914 directly, bypassing 912 without updating L2P mapping table 612.

Figure 10:
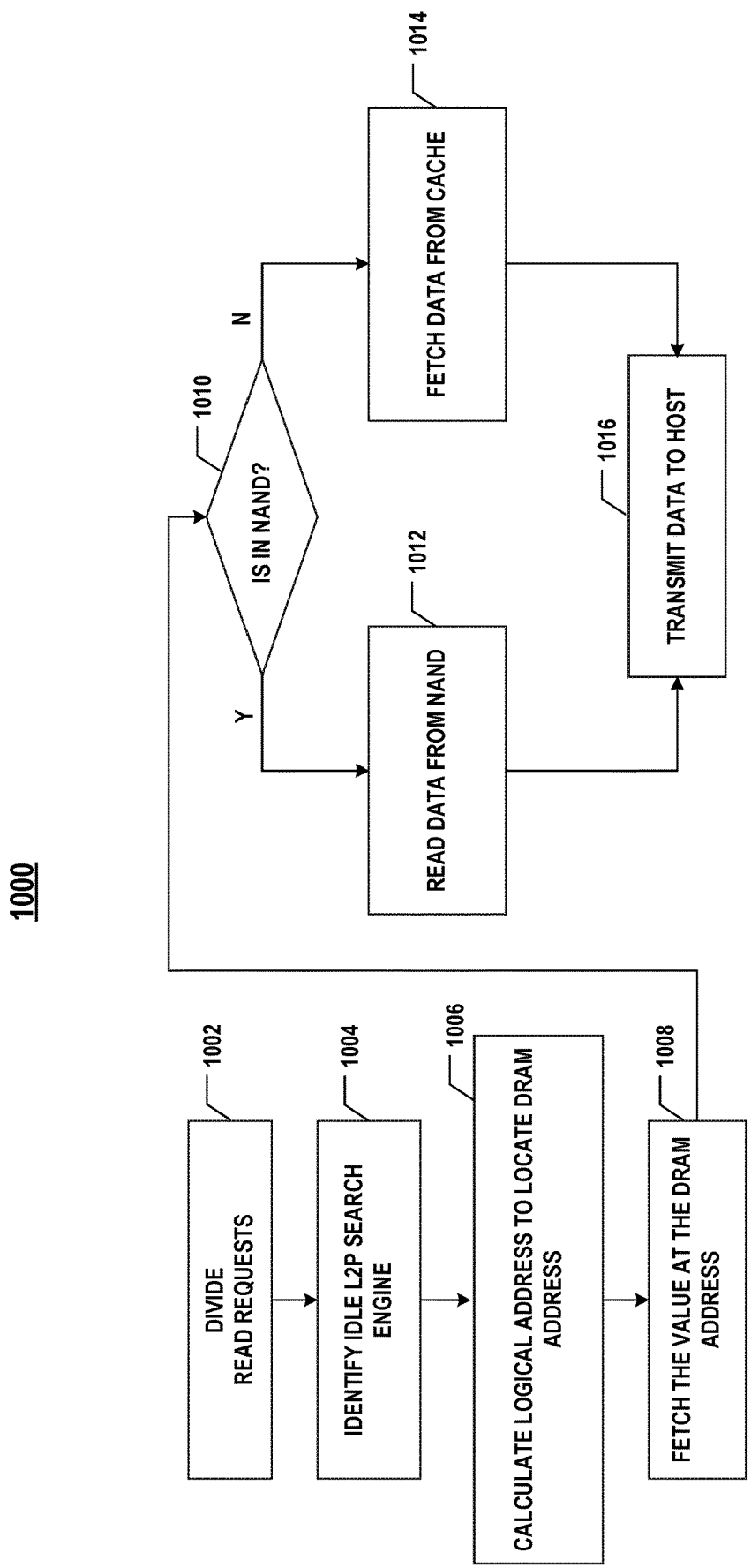
FIG. 10 illustrates a flowchart of a method for handling read requests, according to some aspects of the present disclosure.

In some implementations, in response to receiving a read request indicative of a piece of the first set of data associated with a second logical address of the first set of logical addresses, an address of the L2P mapping table in the volatile memory device based on the second logical address, and a second ID of the second memory block is identified at the address of the L2P mapping table in the volatile memory device. For example, as shown in FIG. 10, at 1002, read requests may be divided by range division accelerator 608 into multiple search requests each associated with a logical address. At 1004, idle L2P search engines 610 may be identified by range division accelerator 608 to perform the search requests. At 1006, the DRAM address may be located by L2P search engine 610 by calculating the logical address, e.g., adding the logical address to the address offset to obtain the DRAM address. At 1008, the value at the DRAM address may be fetched by L2P search engine 610.

In some implementations, in response to the value being one of the IDs of the memory blocks in the volatile memory device, the piece of the first set of data is fetched from the second memory block of the memory blocks in the cache based on the L2P mapping table. For example, at 1010, whether the piece of host/user data is in the NAND Flash memory or not may be determined based on the fetched value, either a memory block ID or a PPA, at 1008. If the answer to 1010 is no, meaning that the piece of host/user data is still in the cache, at 1014, the piece of host/user data may be fetched by volatile memory interface 620 from the cache based on the fetched memory block ID at the DRAM address. If the answer to 1010 is yes, meaning that the piece of host/user data is in the NAND Flash memory, at 1012, the piece of host/user data may be read by non-volatile memory interface 622 from the NAND Flash memory based on the fetched PPA at the DRAM address. In either case, at 1016, the piece of host/user data may be transmitted to the host by host interface 618.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a memory controller, such as memory controller 601 in FIG. 6. By way of example, and not limitation, such computer-readable media can include RAM, ROM, electrically erasable programmable ROM (EEPROM), compact disc read-only memory (CD-ROM) or other optical disk storage, hard disk drive (HDD), such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

Although specific configurations and arrangements are discussed, it should be understood that this is done for illustrative purposes only. As such, other configurations and arrangements can be used without departing from the scope of the present disclosure. Also, the subject matter as described in the present disclosure can also be used in a variety of other applications. Functional and structural features as described in the present disclosures can be combined, adjusted, modified, and rearranged with one another and in ways that are consistent with the scope of the present disclosure.

What is claimed is:

1. A memory system, comprising:
   a volatile memory device configured to store a logical-to-physical (L2P) mapping table; and
   a memory controller operatively coupled to the volatile memory device, and configured to maintain the L2P mapping table stored in the volatile memory device, such that the L2P mapping table maps a first set of logical addresses to identifiers (IDs) of memory blocks of a cache, respectively,
   wherein the memory controller comprises an L2P search engine, and in response to receiving a read request indicative of a first piece of a first set of data associated with a first logical address of the first set of logical addresses, the L2P search engine is configured to:
      determine an address of the L2P mapping table in the volatile memory device based on the first logical address and an address offset associated with the L2P mapping table, wherein the address offset is determined based on where the L2P mapping table is stored in the volatile memory device; and
      identify a first ID of the IDs at the address of the L2P mapping table in the volatile memory device,
   wherein the memory controller is further configured to fetch the first piece of the first set of data from a first memory block of the memory blocks in the cache based on the first ID, the first memory block having the first ID, and
   wherein in response to receiving a write request indicative of a second piece of the first set of data associated with a second logical address of the first set of logical addresses, the memory controller is configured to:
in response to the second piece of the first set of data being cached into a second memory block of the memory blocks in the cache, update the L2P mapping table to map the second logical address to a second ID of the second memory block; and
in response to the second piece of the first set of data being flushed from the second memory block of the cache to a memory region of a non-volatile memory device associated with a physical address, update the L2P mapping table to map the second logical address to the physical address by replacing the second ID with the physical address.

2. The memory system of claim 1, wherein the memory controller is further configured to cache the first set of data in the memory blocks, the first set of data being associated with the first set of logical addresses, respectively.

3. The memory system of claim 2, wherein the memory controller is further configured to search the first set of data cached in the memory blocks based on the L2P mapping table.

4. The memory system of claim 1, wherein the volatile memory device comprises the cache.

5. The memory system of claim 1, further comprising:
the non-volatile memory device operatively coupled to the memory controller,
wherein the memory controller is further configured to:
store a second set of data in memory regions of the non-volatile memory device, the second set of data being associated with a second set of logical addresses, respectively, and
maintain the L2P mapping table stored in the volatile memory device, such that the L2P mapping table also maps the second set of logical addresses to physical addresses of the memory regions of the non-volatile memory device, respectively.

6. The memory system of claim 5, wherein the volatile memory device comprises dynamic random-access memory (DRAM), and the non-volatile memory device comprises NAND Flash memory.

7. The memory system of claim 1, wherein the memory controller is further configured to:
in response to receiving the write request indicative of the second piece of the first set of data associated with the second logical address of the first set of logical addresses, assign the second piece of the first set of data to the second memory block of the memory blocks; and
fetch the second piece of the first set of data to cache the second piece of the first set of data into the second memory block.

8. A memory system, comprising:
a non-volatile memory device comprising memory regions each associated with a physical address;
a volatile memory device comprising memory blocks each associated with an identifier (ID), the volatile memory device being configured to store a logical-to-physical (L2P) mapping table, wherein the L2P mapping table maps logical addresses of data to the IDs of the memory blocks in the volatile memory device and the physical addresses of the memory regions in the non-volatile memory device, respectively; and
a memory controller operatively coupled to the volatile memory device and the non-volatile memory device, and configured to search a first piece of the data based on the L2P mapping table,
wherein to search the first piece of the data, the memory controller is configured to:
determine an address of the L2P mapping table in the volatile memory device based on a first logical address associated with the first piece of the data and an address offset associated with the L2P mapping table, wherein the address offset is determined based on where the L2P mapping table is stored in the volatile memory device; and
determine a value at the address of the L2P mapping table,
wherein in response to receiving a write request indicative of a second piece of the data associated with a second logical address, the memory controller is configured to:
in response to the second piece of the data being cached into a first memory block of the memory blocks in the cache, update the L2P mapping table to map the second logical address to a first ID of the first memory block; and
in response to the second piece of the data being flushed from the first memory block of the cache to a first memory region of the non-volatile memory device associated with a first physical address, update the L2P mapping table to map the second logical address to the first physical address by replacing the first ID with the first physical address.

9. The memory system of claim 8, wherein to search the first piece of the data, the memory controller is further configured to:
in response to the value being a second ID of the IDs of the memory blocks in the volatile memory device, fetch the first piece of the data from a second memory block in the volatile memory device having the second ID; or
in response to the value being a second physical address of the physical addresses of the memory regions in the non-volatile memory device, fetch the first piece of the data from a second memory region in the non-volatile memory device having the second physical address.

10. The memory system of claim 8, wherein to search the first piece of data, the memory controller comprises a plurality of L2P search engines configured to search a plurality of pieces of the data, respectively, in parallel based on the L2P mapping table.

11. The memory system of claim 8, wherein the memory controller is further configured to cache the first piece of the data in the volatile memory device or flush the first piece of the data from the volatile memory device to the non-volatile memory device.

12. A memory controller, comprising:
a volatile memory device interface operatively coupled to a volatile memory device; and
a logical-to-physical (L2P) search engine configured to maintain an L2P mapping table stored in the volatile memory device through the volatile memory device interface, such that the L2P mapping table maps a first set of logical addresses to identifiers (IDs) of memory blocks of a cache, respectively,
wherein in response to receiving a read request indicative of a first piece of a first set of data associated with a first logical address of the first set of logical addresses, the L2P search engine is configured to:
determine an address of the L2P mapping table in the volatile memory device based on the first logical address and an address offset associated with the L2P mapping table, wherein the address offset is determined based on where the L2P mapping table is stored in the volatile memory device; and identify a first ID of the IDs at the address of the L2P mapping table in the volatile memory device, wherein the volatile memory device interface is further configured to fetch the first piece of the first set of data from a first memory block of the memory blocks in the cache based on the first ID, the first memory block having the first ID, and wherein in response to receiving a write request indicative of a second piece of the first set of data associated with a second logical address of the first set of logical addresses, the L2P search engine is configured to:

in response to the second piece of the first set of data being cached into a second memory block of the memory blocks in the cache, update the L2P mapping table to map the second logical address to a second ID of the second memory block; and in response to the second piece of the first set of data being flushed from the second memory block of the cache to a memory region of a non-volatile memory device associated with a physical address, update the L2P mapping table to map the second logical address to the physical address by replacing the second ID with the physical address.

13. The memory controller of claim 12, wherein the L2P search engine is further configured to search the first set of data associated with the first set of logical addresses and cached in the memory blocks based on the L2P mapping table.

14. The memory controller of claim 12, further comprising:

a non-volatile memory device interface operatively coupled to the non-volatile memory device, wherein the L2P search engine is further configured to maintain the L2P mapping table stored in the volatile memory device, such that the L2P mapping table also maps a second set of logical addresses to physical addresses of memory regions of the non-volatile memory device, respectively.

15. The memory controller of claim 14, wherein the L2P search engine is further configured to search a second set of data associated with the second set of logical addresses and stored in the memory regions based on the L2P mapping table.

16. The memory controller of claim 12, further comprising:

a range division accelerator configured to, in response to receiving the write request indicative of the second piece of the first set of data associated with the second logical address of the first set of logical addresses, assign the second piece of the first set of data to the second memory block of the memory blocks; and a host interface configured to fetch the second piece of the first set of data to cache the second piece of the first set of data into the second memory block.

17. The memory system of claim 8, wherein the volatile memory device comprises a cache which comprises the memory blocks.

18. The memory system of claim 8, wherein the volatile memory device comprises dynamic random-access memory (DRAM), and the non-volatile memory device comprises NAND Flash memory.

19. The memory system of claim 1, wherein to determine the address of the L2P mapping table in the volatile memory device, the L2P search engine is further configured to determine the address of the L2P mapping table based on a sum of the first logical address and the address offset associated with the L2P mapping table.

20. The memory controller of claim 12, wherein the volatile memory device comprises dynamic random-access memory (DRAM), and the non-volatile memory device comprises NAND Flash memory.

* * * * *